United States Patent Office 3,646,042
Patented Feb. 29, 1972

3,646,042
CERTAIN N-PHENYL, N-LOWER-ALKYL-PYRIDINE CARBOXAMIDES AND DERIVATIVES THEREOF
John Krenzer, Oak Park, and Sidney B. Richter, Chicago, Ill., assignors to Velsicol Chemical Corporation, Chicago, Ill.
No Drawing. Continuation-in-part of application Ser. No. 694,124, Dec. 28, 1967. This application Feb. 9, 1970, Ser. No. 10,057
Int. Cl. C07d 31/36
U.S. Cl. 260—294.9    7 Claims

ABSTRACT OF THE DISCLOSURE

A compound of the formula

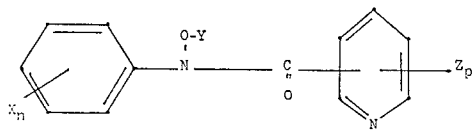

wherein $n$ is an integer from 1 to 3; X is selected from the group consisting of halogen, lower alkyl, nitro, hydroxy, lower alkoxy, lower alkanoyl, and cyano; Y is selected from the group consisting of lower alkyl, lower alkanoyl, lower alkoxycarbonyl, lower alkythiocarbonyl and carbamoyl, Z is selected from the group consisting of halogen, lower alkyl, lower alkoxy, cyano and nitro; and $p$ is an integer from 0 to 2.

This application is a continuation-in-part of our copending application Ser. No. 694,124, filed Dec. 28, 1967 now Pat. No. 3,541,106 granted Nov. 17, 1970.

This invention relates to new compounds and to pesticidal compositions containing such compounds as well as to methods of utilizing such compositions to control pests.

The compounds of this invention can be represented by the following formula:

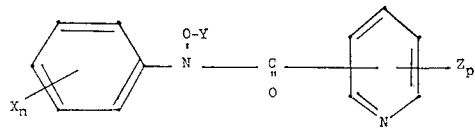

wherein $n$ is an integer from 1 to 3; X is selected from the group consisting of halogen, lower alkyl, nitro, hydroxy, lower alkoxy, lower alkanoyl, and cyano; Y is selected from the group consisting of lower alkyl, lower acyl, lower alkoxycarbonyl, lower alkylthiocarbonyl and carbamoyl, Z is selected from the group consisting of halogen, lower alkyl, lower alkoxy, cyano and nitro; and $p$ is an integer from 0 to 2. The term lower as used herein designates a straight or branched carbon chain of up to about 5 carbon atoms.

In a preferred class of the compounds represented by the above formula, the carbonyl group is attached to the pyridyl ring in the 3 position. The compounds represented by the above general formula are effective as pesticides and particularly as fungicides.

The compounds of this invention can be prepared from intermediary compounds of Formula I where Y is hydrogen. When compounds are desired where Y of Formula I is hydrogen, then an N-phenylhydroxylamine of the formula:

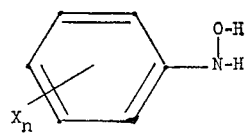

can be reacted with a pyridinecarbonyl halide of the formula:

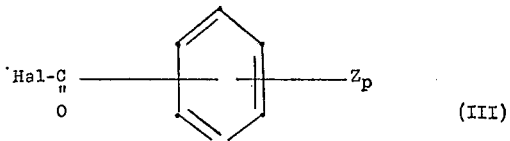

to form an N-phenyl-N-hydroxypyridinecarboxamide. In the above Formulae II and III, X, $n$, $p$ and Z have the same significance as for Formula I above and Hal represents a halogen such as chlorine or bromine. For example, X can be halo such as chloro, bromo, iodo, or fluoro; an aliphatic radical such as alkyl of from 1 to about 5 carbon atoms or alkenyl of from 2 to about 5 carbon atoms; nitro; hydroxy; alkoxy where the alkyl portion contains from 1 to 5 carbon atoms; acyl or acyloxy, such as saturated or unsaturated acyl or acyloxy containing from 1 to about 5 carbon atoms; or cyano; and Z can be halo; alkyl or alkoxy with both containing from 1 to about 5 carbon atoms; cyano; nitro, or acyl such as saturated or unsaturated acyl containing from 1 to about 5 carbon atoms. When compounds represented by Formula I are desired having Y other than hydrogen, then an N-phenyl-N-hydroxy-pyridinecarboxamide, prepared as above, can be further reacted to form the compounds represented by Formula I having the desired Y substituent. For example, the N-phenyl-N-hydroxypyridinecarboxamide represented by Formula I where Y is hydrogen can be further reacted to form compounds where Y is alkyl and preferably alkyl of from 1 to about 5 carbon atoms; acyl of the formula:

where $R_a$ is an alkyl group of from 1 to about 5 carbon atoms; alkoxycarbonyl or alkylthiocarbonyl of the formula:

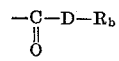

where D is an oxygen or sulfur atom, respectively, and where $R_b$ is alkyl of from 1 to about 5 carbon atoms; or a carbamoyl radical of the formula:

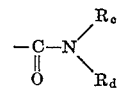

where $R_c$ and $R_d$ are selected from hydrogen, phenyl or alkyl of from 1 to about 5 carbon atoms.

The substituents X, Y and Z of Formula I which are illustrated above can also be substituted, where possible, with such groups as halo, hydroxy, alkoxy, acyl, acyloxy, nitro or combinations thereof. For example, X can be haloalkyl, such as chloromethyl, trifluoromethyl; hydroxyalkyl, such as 3-hydroxypropyl; nitroalkyl such as 2-nitroethyl; or haloacyl such as trichloroacetyl; and Y can be haloalkyl; or haloacyl such as trichloroacetyl. Suitable N-phenylhydroxylamines of Formula II which can be reacted with a pyridinecarbonyl halide of Formula III to form the compounds of Formula I where Y is hydrogen include:

N-4-chlorophenyl-hydroxylamine,
N-3-chlorophenyl-hydroxylamine,
N-3,4-dichlorophenyl-hydroxylamine,
N-2,4,6-trichlorophenyl-hydroxylamine,
N-4-bromophenyl-hydroxylamine,
N-4-methylphenyl-hydroxylamine,
N-3-methylphenyl-hydroxylamine,
N-4-ethylphenyl-hydroxylamine, N-3,4-dimethylphenyl-hydroxylamine,
N-4-chloromethylphenyl-hydroxylamine,
N-4-trifluoromethylphenyl-hydroxylamine,
N-4-hydroxymethylphenyl-hydroxylamine,
N-3-nitrophenyl-hydroxylamine,
N-4-nitrophenyl-hydroxylamine,
N-4-acetylphenyl-hydroxylamine,
N-4-trichloroacetylphenyl-hydroxylamine,
N-3-formyloxyphenyl-hydroxylamine,
N-4-acetyloxyphenyl-hydroxylamine,
N-4-hydroxyphenyl-hydroxylamine,
N-3-hydroxyphenyl-hydroxylamine,
N-3-methoxyphenyl-hydroxylamine,
N-4-ethoxyphenyl-hydroxylamine,
N-4-cyanophenyl-hydroxylamine,
N-3-chloro-4-methylphenyl-hydroxylamine, or
N-3-chloro-4-nitrophenyl-hydroxylamine.

While the pyridine carbonyl halides of Formula III can have the carbonyl group in several of the available ring positions such as the 2, 3 or 4, positions, which includes such compounds as picolinoyl, nicotinoyl and isonicotinoyl halides, respectively, the preferred halides which can be reacted with the N-phenyl-N-hydroxylamines are substituted with the carbonyl group in the 3 ring position, namely, the nicotinoyl halides. Suitable pyridinecarbonyl halides which can be reacted include nicotinoyl halides such as:

4-methyl-nicotinoyl chloride,
4-ethyl-nicotinoyl bromide,
4-propyl-nicotinoyl chloride,
5-n-butyl-nicotinoyl chloride,
4,5-dimethyl-nicotinoyl chloride,
4,5-dibutyl-nicotinoyl chloride,
4-chloro-nicotinoyl chloride,
4-chloro-5-methylnicotinoyl chloride,
5-bromo-nicotinoyl chloride,
4-acetyl-nicotinoyl chloride,
4-cyano-nicotinoyl chloride,
4-methoxy-nicotinoyl chloride,
4,6-dimethyl-nicotinoyl chloride,
5-cyano-nicotinoyl chloride,
5-nitro-nicotinoyl chloride,
6-hydroxy-nicotinoyl chloride,
2,6-dichloro-nicotinoyl chloride,
2-chloro-4-methyl-nicotinoyl chloride,
5-ethoxy-nicotinoyl chloride, or
5-fluoro-nicotinoyl chloride;

picolinoyl halides such as:

3-methyl-picolinoyl chloride,
4-ethyl-picolinoyl bromide,
6-isobutyl-picolinoyl chloride,
5-iodo-picolinoyl chloride,
5-chloro-picolinoyl chloride,
4-methoxy-picolinoyl chloride,
5-acetyl-picolinoyl chloride,
4-chloro-picolinoyl chloride,
3-formyl-picolinoyl chloride,
6-hydroxy-picolinoyl chloride,
5-hydroxy-6-methyl-picolinoyl chloride,
6-nitro-picolinoyl chloride or
6-cyano-picolinoyl chloride;

or isonicotinoyl halides such as:

3-bromo-isonicotinoyl chloride,
3-chloro-isonicotinoyl bromide,
3-iodo-isonicotinoyl chloride,
3-methoxy-isonicotinoyl chlorde,
3-cyano-isonicotinoyl chloride,
6-acetyl-isonicotinoyl chloride, or
2,6-dimethyl-isonicotinoyl chloride.

In effecting the preparational reaction of the N-phenylhydroxylamine of Formula II with the pyridinecarbonyl halide of Formula III, the conditions and procedures used can be widely varied. Typically, the reactions can be effected by simply reacting the halide with the desired N-phenyl-hydroxylamine preferably in the presence of a suitable inert solvent such as dioxane, water and an acid acceptor such as an alkali metal carbonate or bicarbonate such as sodium bicarbonate. In conducting the reaction, it is generally preferred to slowly add the halide to a mixture of the N-phenyl-hydroxylamine, solvent, water and an acid acceptor maintained at a low temperature of about −10° to 50° C. The ratio of the reactants is not usually important and a stoichiometric quantity of the halide and N-phenylhydroxylamine can be suitably used. When the reaction is complete, the desired product can be recovered and purified by conventional techniques including filtration and recrystallization. Examples of the N - phenyl-N-hydroxy-pyridinecarboxamides which can thus be prepared include:

N-4'-chlorophenyl-N-hydroxy-4-methyl-nicotinamide,
N-4'-cyanophenyl-N-hydroxy-4-ethyl-nicotinamide,
N-3'-cyanophenyl-N-hydroxy-4-propyl-nicotinamide,
N-2',6'-diethylphenyl-N-hydroxy-5-n-butyl-nicotinamide,
N-3'-hydroxyphenyl-N-hydroxy-4-chloro-5-methyl-nicotinamide,
N-3'-methoxyphenyl-N-hydroxy-5-bromonicotinamide,
N-3'-ethoxyphenyl-N-hydroxy-4-acetyl-nicotinamide,
N-4'-bromophenyl-N-hydroxy-4-cyano-nicotinamide,
N-2',3'-dimethylphenyl-N-hydroxy-4-nitro-nicotinamide,
N-3',4'-dichlorophenyl-N-hydroxy-4-methoxy-nicotinamide,
N-3'-methyl-4'-chlorophenyl-N-hydroxy-4,6-dimethyl-nicotinamide,
N-3'-bromophenyl-N-hydroxy-6-hydroxy-nicotinamide,
N-3'-isopropylphenyl-N-hydroxy-5-cyano-nicotinamide,
N-4'-chlorophenyl-N-hydroxy-picolinamide,
N-4'-cyanophenyl-N-hydroxy-3-methyl-picolinamide,
N-4'-methylphenyl-N-hydroxy-4-ethyl-picolinamide,
N-4'-hydroxyphenyl-N-hydroxy-6-isobutyl-picolinamide,
N-4'-methoxyphenyl-N-hydroxy-5-iodo-picolinamide,
N-4'-bromophenyl-N-hydroxy-5-chloro-picolinamide,
N-3',4'-dibromophenyl-N-hydroxy-4-methoxy-picolinamide,
N-2',6'-dimethylphenyl-N-hydroxy-4-nitro-picolinamide,
N-4'-acetylphenyl-N-hydroxy-5-acetyl-picolinamide,
N-4'-acetyloxyphenyl-N-hydroxy-3-formyl-picolinamide,
N-4'-nitrophenyl-N-hydroxy-6-hydroxy-picolinamide,
N-4'-methylphenyl-N-hydroxy-6-cyano-picolinamide,
N-4'-chlorophenyl-N-hydroxy-isonicotinamide,
N-3'-nitrophenyl-N-hydroxy-6-nitro-isonicotinamide,
N-3'-bromophenyl-N-hydroxy-3-bromo-isonicotinamide,
N-2'6'-dimethylphenyl-N-hydroxy-3-chloro-isonicotinamide,
N-4'-acetylphenyl-N-hydroxy-3-iodo-isonicotinamide,
N-3'-hydroxyphenyl-N-hydroxy-3-methoxy-isonicotinamide,
N-4'-methoxyphenyl-N-hydroxy-3-cyano-isonicotinamide,
N-3'-methyl-4-chlorophenyl-N-hydroxy-isonicotinamide, or
N-4'-cyanophenyl-N-hydroxy-isonicotinamide.

As indicated, when the compounds of Formula I are desired where Y is other than hydrogen then an N-phenyl-N-hydroxy-pyridine carboxamide, prepared as described above, can be further reacted with a suitable reactant to form the compounds having the desired Y substituent. For example, when Y is to be alkyl, then the reactant employed can be an alkylsulfate where the alkyl portion contains from 1 to about 5 carbon atoms such as dimethyl- or diethyl sulfate; when Y is to be acyl, then the reactant can be acyl halide containing from 1 to about 5 carbon atoms such as acetyl-, propionyl-, or butyryl chlorides; when Y is to be alkoxycarbonyl or alkylthiocarbonyl then the reactant can be an alkyl ester of haloformic or halothioformic acids, respectively, where the alkyl portion contains from 1 to about 5 carbon atoms such as methyl-, ethyl-, or propyl chloroformates or chlorothioformates;

when Y is to be a carbamoyl radical, then the reactant can be an isocyanate or carbamoyl chloride such as potassium-, methyl-, or ethyl isocyanate, N,N'-diphenyl carbamoyl chloride, N,N'-dimethylcarbamoyl chloride or N-phenylcarbamoyl chloride.

In reacting any of the above reactants with an N-phenyl-N-hydroxy-pyridine carboxamide to prepare the compounds of Formula I, where Y is other than hydrogen, the procedures and conditions utilized can be widely varied. Typically, however, those procedures and conditions which are conveniently used for O-alkylation or esterification reactions using similar reactants can be suitably utilized. Examples of the compounds of Formula I where Y is other than hydrogen which can thus be prepared include:

N-3'-bromophenyl-N-methoxy-nicotinamide,
N-4'-methoxyphenyl-N-ethoxy-4-methyl-nicotinamide,
N-3',4'-dibromophenyl-N-butoxy-nicotinamide,
N-3',4'-dichlorophenyl-N-acetoxy-nicotinamide,
N-4'-ethyl phenyl-N-propionyloxy-4-chloronicotinamide,
N-3'-methylphenyl-N-methoxy-4-nitro-nicotinamide,
N-4'-cyanophenyl-N-ethoxy-carbonyloxynicotinamide,
N-3'-formyloxyphenyl-N-methyl-thiocarbonyloxy-nicotinamide,
N-4'-methylphenyl-N-methoxy-carbonyloxynicotinamide,
N-2',6'-dimethylphenyl-N-ethyl-thiocarbonyloxy-5-methyl-nicotinamide,
N-4'-trichloroacetylphenyl-N-carbamoyloxy-nicotinamide,
N-3',4'-dichlorophenyl-N-carbanoyloxy-4-methyl-nicotinamide,
N-4'-ethoxyphenyl-N-(N-methylcarbanoyloxy)-nicotinamide,
N-4'-nitrophenyl-N-(N,N'-dimethylcarbonyloxy)-nicotinamide,
N-4'-bromophenyl-N-methoxy-picolinamide,
N-4'-methylphenyl-N-ethoxy-picolinamide,
N-2',3'-diethylphenyl-N-acetoxy-4-methyl-picolinamide,
N-4'-hydroxyphenyl-N-butoxy-picolinamide,
N-4'-methoxyphenyl-N-methoxycarbonyloxy-picolinamide,
N-4'-chlorophenyl-N-ethoxycarbonyloxy-5-chloro-picolinamide,
N-4'-chlorophenyl-N-ethoxycarbonyloxy-5-chloro-picolinamide,
N-4'-trifluoromethylphenyl-N-methylthiocarbonyloxy-picolinamide,
N-3'-nitrophenyl-N-carbamoyloxy-4-ethyl-picolinamide,
N-3',4'-dichlorophenyl-N-methoxy-isonicotinamide,
N-2',6'-dimethylphenyl-N-ethoxy-3-bromo-isonicotinamide,
N-4'-methoxyphenyl-N-acetoxy-3-methoxy-isonicotinamide,
N-4'-bromophenyl-N-methoxycarbonyloxy-isonicotinamide,
N-3'-methylphenyl-4'-chlorophenyl-N-methylthiocarbonyloxy-3-cyano-isonicotinamide, or
N-4'-ethylphenyl-N-carbamoyloxy-isonicotinamide.

The compounds of this invention and the method of preparation therefor can be further illustrated by the following examples:

EXAMPLE 1

N-4'-chlorophenyl-N-hydroxy-nicotinamide

About 15.0 grams (0.105 mol) of N-4-chlorophenyl-hydroxylamine, 14 grams of sodium bicarbonate, 125 ml. of dioxane and 30 ml. of water were added to a reaction flask. With stirring, 14.9 grams (0.105 mol) of nicotinoyl chloride were slowly added over a period of about 15 minutes with the temperature maintained at about 0° to 5° C. After stirring for about ½ hour, the reaction mixture was combined with ice water. The resultant solids were filtered from the reaction mixture and recrystallized from ethyl acetate to recover about 12.4 grams of a yellow product having a melting point of 131° to 133° C.

Analysis for $C_{12}H_9ClN_2O_2$: Theoretical (percent): C, 57.98; H, 3.65; Cl, 14.26. Found (percent): C, 57.97; H, 4.11; Cl, 14.22.

EXAMPLE 2

N-4'-methylphenyl-N-hydroxy-nicotinamide

About 14 grams (0.114 mol) of N-4-methylphenylhydroxylamine were reacted with 16.1 grams (0.114 mol) of nicotinoyl chloride according to the general procedure of Example 1 to produce 12.0 grams of an orange, crystalline product having a melting point of 150° to 152° C.

Analysis for $C_{13}H_{12}N_2O_2$: Theoretical (percent): C, 68.44; H, 5.30; N, 12.28. Found (percent): C, 68.39; H, 5.85; N, 12.00.

EXAMPLE 3

N-3'-chloro-4'-methylphenyl-N-hydroxy-nicotinamide

About 15 grams (0.095 mol) of N-3-chloro-4-methylphenyl-hydroxylamine were reacted with 14.5 grams (0.102 mol) of nicotinoyl chloride, according to the general procedure of Example 1, to produce 10.8 grams of a yellow, crystalline product having a melting point of 137° to 138° C.

Analysis for $C_{13}H_{14}ClN_2O_2$: Theoretical (percent): C, 59.47; H, 4.22; Cl, 13.55. Found (percent): C, 59.23; H, 4.46; Cl, 13.23.

EXAMPLE 4

N-2',3'-dimethylphenyl-N-hydroxy-nicotinamide

About 9.0 grams (0.066 mol) of N-2,3-dimethylphenyl-hydroxylamine were reacted with 9.5 grams (0.067 mol) of nicotinoyl chloride according to the general procedure of Example 1 to produce 8.0 grams of an orange, crystalline product having a melting point of 150° to 153° C.

EXAMPLE 5

N-3',4'-dichlorophenyl-N-hydroxy-nicotinamide

About 18.0 grams (0.10 mol) of N-3,4-dichlorophenyl-hydroxylamine were reacted with 14.0 grams (0.10 mol) of nicotinoyl chloride according to the general procedure of Example 1 to produce 5.9 grams of a yellow, crystalline product having a melting point of 153° to 155° C.

EXAMPLE 6

N-3'-nitro-4'-methylphenyl-N-hydroxy-picolinamide

About 10 grams (0.060 mol) of N-3-nitro-4-methylphenyl-hydroxylamine are reacted with 8.5 grams (0.060 mol) of picolinoyl chloride according to the general procedure of Example 1 to produce the desired product.

EXAMPLE 7

N-2',6'-dimethylphenyl-N-hydroxy-isonicotinamide

About 10.0 grams (0.073 mol) of N-2,6-dimethylphenyl-hydroxylamine are reacted with 10.4 grams (0.073 mol) of isonicotinoyl chloride according to the general procedure of Example 1 to produce the desired product.

EXAMPLE 8

N-4'-chlorophenyl-N-methoxy-nicotinamide

About 16 grams (0.065 mol) of N-4-chlorophenyl-N-hydroxy-nicotinamide are charged together with 20 ml. of dioxane, 10 ml. of water, and 20 grams of potassium carbonate to a reaction flask. With the temperature about 45° C., 12.6 grams (0.1 mol) of dimethyl sulfate are added over a period of about 5 minutes. The mixture is then stirred for about ½ hour and then cooled to about −5° C. Water is added and the resulting solids are recovered and dissolved in diethyl ether. After drying the resultant solution over magnesium sulfate the solvent is removed. The residue is then recrystallized to yield the desired product.

EXAMPLE 9

N-3'-nitro-4'-methylphenyl-N-methoxy-picolinamide

About 11.4 grams (0.05 mol) of N-3'-nitro-4'-methylphenyl-N-hydroxy-picolinamide are reacted with 12.6 grams (0.1 mol) of dimethyl sulfate according to the general procedure of Example 8 to produce the desired product.

EXAMPLE 10

N-2',6'-dimethylphenyl-N-methoxy-isonicotinamide

About 12.2 grams (0.05 mol) of N-2,6-dimethylphenyl-N-hydroxy-isonicotinamide are reacted with 12.6 grams (0.1 mol) of dimethyl sulfate according to the general procedure of Example 8 to produce the desired product.

EXAMPLE 11

N-4'-chlorophenyl-N-carbamoyloxy-nicotinamide

About 24.9 grams (0.1 mol) of N-4-chlorophenyl-N-hydroxy-nicotinamide dissolved in acetone are charged to a reaction flask. With the temperature maintained at about −10° C., 6.7 grams of potassium isocyanate (0.1 mol) are added followed by the addition of about 30 ml. of concentrated hydrochloric acid. The reaction mixture is stirred and the temperature allowed to rise to about 25° C. Water is then added and the stirring continued for about one hour. After removing the acetone under vacuum, the residue is recrystallized from ethyl acetate to yield the desired product.

EXAMPLE 12

N-4'-chlorophenyl-N-acetyloxy-4-chloronicotinamide

About 28.2 grams (0.10 mol) of N-4'-chlorophenyl-N-hydroxy-4-chloronicotinamide, 15 ml. of triethylamine and 400 ml. of ether are added to a reaction flask. The mixture is cooled to 10° C. and with stirring 7.9 grams of acetyl chloride (0.10 mol) are added over a period of about 15 minutes. After stirring for a period of about 2 hours, the reaction mixture is filtered, and the ether solution is evaporated to dryness. The solid residue is purified by recrystallization to yield the desired product.

EXAMPLE 13

N-4'-ethylphenyl-N-ethoxycarbonyloxy-4-nitronicotinamide

About 28.7 grams (0.10 mol) of N-4'-ethylphenyl-N-hydroxy-4-nitronicotinamide, 15 ml. of triethylamine and 400 ml. of ether are added to a reaction flask. The mixture is cooled to 0–5° C., and with stirring 10.8 grams of ethyl chloroformate (0.10 mol) is added over a period of about 15 minutes. After stirring for about 2 hours, the reaction mixture is filtered, and the ether solution is evaporated to dryness. The residue is purified by recrystallization to yield the desired product.

EXAMPLE 14

N-4'-bromophenyl-N-ethtylthiocarbonoyloxy-4-methoxynicotinamide

About 32.2 grams (0.10 mol) of N-4'-bromophenyl-N-hydroxy-4-methoxynicotinamide, 15 ml. of triethylamine and 400 ml. of ether are added to a reaction flask. The mixture is cooled to about 0 to 5° C., and 12.5 grams of ethylthiochloroformate (0.10 mol) are added with stirring over a period of about 15 minutes. After stirring for about 2 hours, the reaction mixture is filtered, and the ether solution is evaporated to dryness. The residue is purified by recrystallization to yield the desired product.

EXAMPLE 15

N-4'-methoxyphenyl-N-dimethylcarbamoyloxy-5-methylnicotinamide

About 24 grams (0.1 mol) of N-4'-methoxyphenyl-N-hydroxy-5-methylnicotinamide dissolved in acetone are charged to a reaction flask. With the temperature maintained at about −10° C., 11 grams of dimethylcarbamoyl chloride (0.1 mol) are added followed by the addition of about 30 ml. of concentrated hydrochloric acid. The reaction mixture is stirred and the temperature is allowed to rise to about 25° C. Water is then added and the stirring continued for about one hour. After removing the acetone under vacuum, the residue is recrystallized to yield the desired product.

Additional compounds within the scope of the present invention can be prepared by the procedures detailed in the foregoing examples. In the following examples are given the essential starting materials required to prepare the indicated named compounds by the methods heretofore described.

EXAMPLE 16

N-4'-fluorophenyl - N - hydroxy - 4 - cyanopicolinamide+di-n-propylsulfate=N-4'-fluorophenyl - N - propoxy-4-cyanopicolinamide.

EXAMPLE 17

N - 4'-hydroxyphenyl-N-hydroxy - 5 - pentylnicotinamide+propanoyl chloride=N-4'-hydroxyphenyl - N - propanoyloxy-5-pentylnicotinamide.

EXAMPLE 18

N-4'-cyanophenyl-N-hydroxy - 4 - bromo-6-pentyloxypicolinamide+phenylcarbamoyl chloride=N - 4' - cyanophenyl-N-phenylcarbamoyloxy - 4 - bromo - 6 - pentyloxypicolinamide.

EXAMPLE 19

N-3'-acetyl - N - hydroxy - 5 - fluoronicotinamide+pentanoyl chloride=N-3'-acetyl-N-pentanoyloxy - 5 - fluoronicotinamide.

EXAMPLE 20

N - 2'-ethoxy-4'-pentylphenyl - N - hydroxy - 4 - ethylnicotinamide+propyl chloroformate=N-2'-ethoxy-4'-pentylphenyl-N-propoxycarbonyloxy-4-ethylnicotinamide.

EXAMPLE 21

N-4'-pentyloxy - N - hydroxy - 2 - fluoroisonicotinamide+dipentylcarbamoyl chloride=N-4'-pentyloxy - N - dipentylcarbamoyloxy-2-fluoroisonicotinamide.

EXAMPLE 22

N-3',4'-dichlorophenyl - N - hydroxynicotinamide+pentyl chloroformate=N - 3',4'-dichlorophenyl-N-pentyloxycarbonyloxynicotinamide.

EXAMPLE 23

N - 4'-cyanophenyl-N-hydroxynicotinamide+carbamoyl chloride=N - 4' - cyanophenyl - N - carbamoyloxynicotinamide.

EXAMPLE 24

N-2',4'-dinitrophenyl - N - hydroxynicotinamide+methyl chloroformate=N-2',4'-dinitrophenyl - N - methoxycarbonyloxynicotinamide.

EXAMPLE 25

N-3',4'-dichlorophenyl - N - hydroxynicotinamide+dimethylcarbamoyl chloride=N - 3',4' - dichlorophenyl-N-dimethylcarbamoyloxynicotinamide.

As indicated, the compounds of this invention are useful as pesticides and particularly as fungicides.

For practical use as fungicides, the compounds of this invention are generally incorporated into fungicidal compositions which comprise an inert carrier and a fungicidally toxic amount of at least one of the compounds. Such fungicidal compositions, also defined as formulations, enable the active compound to be applied conveniently, in any desired quantity, to the site of the fungus infestation. These compositions can be solids such as dusts, granules, or wettable powders, or they can be liquids such as solutions, aerosols, or emulsifiable concentrates.

For example, dusts can be prepared by grinding and blending the active compound with a solid inert carrier such as the talcs, clays, silicas, pyrophyllite, and the like. Granular formulations can be prepared by impregnating the compounds, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

In some cases the compounds are sufficiently soluble in common organic solvents such as kerosene or xylene so that they can be used directly dissolved in such solvents. Frequently, these solutions can be dispersed under superatmospheric pressure as aerosols. However, preferred liquid fungicidal compositions are emulsifiable concentrates, which consist of one or more compounds of this invention and a solvent and an emulsifier as the inert carrier. Such emulsifiable concentrates can be extended with water and/or oil to any desired concentration of the compound for application as sprays to the site of the fungus infestation. The emulsifiers most commonly used in these concentrates are nonionic or mixtures of nonionic with anionic surface-active agents.

A typical fungicidal composition according to this invention is illustrated by the following example, in which the quantities are in parts by weight.

EXAMPLE 26

Product of Example 8 _____ 10
Powdered talc _____ 90

The above ingredients are mixed in a mechanical grinder-blender and are ground until a homogenous, free-flowing dust of the desired particle size is obtained. This dust is suitable for direct application to the site of the fungus infestation.

The compounds of this invention can be applied as fungicides in any manner recognized by the art. One method for destroying fungi comprises applying to the locus of the fungus infestation, a fungicidal composition comprising an inert carrier and as the essential active ingredient, in a quantity which is toxic to the fungus, at least one of the compounds of this invention. The concentration of the compounds of this invention, individually or in admixture, in the fungicidal compositions will vary greatly depending on the type of formulation and the purpose for which it is designed, but generally the compositions will contain from about 0.05 to about 95 percent by weight of the compounds of this invention. In a preferred embodiment of this invention, the fungicidal compositions contain from about 5 to 75 percent by weight of the compound. The compositions can also contain additional substances such as other pesticides, stabilizers, spreaders, deactivators, adhesives, stickers, fertilizers, or activators.

When the compounds of this invention are used as agricultural fungicides, they can be applied to plant foliage, to seeds, to the soil, or to such parts of plants as the fruits themselves. Plants are susceptible to a great many diseases which cause widespread damage; and among some of the more important which can be mentioned are late blight on tomato, powdery mildew on cucumber (*Erisiphe cichoracearum*), cereal leaf rust on wheat (*Puccinia rubigo-vera*), and such common soil fungi as fusarium wilt (*Fusarium oxysporum*), and seed rot fungus (*Phythium debaranum*), and the sheath and culm blight (*Rhizoctonia solani*). The new compounds of this invention can also be employed as industrial fungicides to control a variety of fungi which attack such materials as adhesives, cork, paints, lacquers, leather, wood, plastics, and textiles such as cotton and wool.

The quantity of active compound of this invention to be used for good disease control will depend on a variety of factors, such as the particular disease involved, the intensity of the infestation, formulation, weather, type of crop and the like. Thus, while the application of only one or two ounces of active compound per acre of a crop may be sufficient to control a light infestation of certain fungi, a pound or more of active compound per acre may be required to control a heavy infestation of a hardy species of fungus.

The compounds of this invention can be combined with different fungicides to form synergistic fungicidal compositions. For example, the compounds can be combined with such fungicides as ferbam, nabam, zineb, ziram, thiram, chloranil, dichlone, glyodin, cycloheximide, dinocap, maneb, captan, dodine, PCNB, or p-dimethylaminobenzenediazo sodium sulfonate.

EXAMPLE 27

The fungicidal activity of the compounds of this invention can be demonstrated by the following tests:

An emulsifiable concentrate containing the test compound at a rate of 25 mg. per ml. was prepared by dissolving the test compound in a suitable solvent such as acetone containing a surface active agent (polyoxyalkylene derivatives of sorbitan monolaurate and/or monooleate, 2.48 mg. per 80 ml. of acetone).

One of the compounds was used to control the fungus *Puccinia rubigo-vera* (leaf rust of wheat) by first preparing an aqueous fungicidal spray composition by admixing the above prepared emulsifiable concentrate with sufficient water to provide the desired concentration of the test compound. A series of six day old Henry wheat plants are treated by spraying with the composition for a period of about 30 seconds at a spray pressure of 80 pounds per square inch. Another series of plants are not so treated and are used for comparative purposes. After the treated plants are dried, both the treated and untreated plants are inoculated with a 9 to 13 day old culture of the fungus. The plants are then stored under conditions favorable to fungus growth for a period of 8 days. At the end of the period the plants are examined to determine the extent of fungus growth.

We claim:
1. A compound of the formula

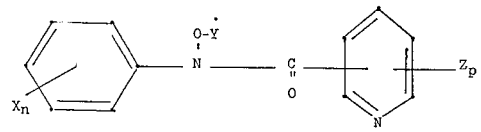

wherein *n* is an integer from 1 to 3; X is selected from the group consisting of halogen, lower alkyl, nitro, hydroxy, lower alkoxy, lower alkanoyl, and cyano; Y is selected from the group consisting of lower alkyl, lower alkanoyl, lower alkoxycarbonyl, and carbamoyl, Z is selected from the group consisting of halogen, lower alkyl, lower alkoxy, cyano and nitro; and *p* is an integer from 0 to 2.

2. A compound of claim 1 wheerin the carbonyl group is attached to the 3-position of the pyridyl ring.

3. The compound of claim 1, N-4'-chlorophenyl-N-methoxy-nicotinamide.

4. The compound of claim 1, N-2'-methyl-4'-chlorophenyl-N-acetyloxy-nicotinamide.

5. The compound of claim 1, N-4'-cyanophenyl-N-carbamoyloxy-nicotinamide.

6. The compound of claim 1, N-2',4'-dinitrophenyl-N-methoxycarbonyloxy-nicotinamide.

7. The compound of claim 1, N-3',4'-dichlorophenyl-N-dimethylcarbamoyloxy-nicotinamide.

References Cited

UNITED STATES PATENTS 3,166,562   1/1965   Leditschke et al. ____ 260—295.5

ALAN L. ROTMAN, Primary Examiner

U.S. Cl. X.R.

260—294.8 E, 295 AM, 295 CA, 295.5 A, 295.5 C; 424—266